United States Patent

Haataja et al.

[11] Patent Number: 5,923,753
[45] Date of Patent: Jul. 13, 1999

[54] OPTIC CABLE EXIT TROUGH WITH BYPASS

[75] Inventors: Timothy Jon Haataja, Prior Lake; Thomas Walter Kampf, Minnetonka; Wayne Albin Johnson, Rosemount; Gary F. Nault, Bloomington, all of Minn.

[73] Assignee: ADC Telecommunications, Inc., Minnetonka, Minn.

[21] Appl. No.: 08/971,419

[22] Filed: Nov. 17, 1997

[51] Int. Cl.$^6$ ..................................................... H04M 1/00
[52] U.S. Cl. ............................................. 379/438; 379/437
[58] Field of Search ...................................... 379/437, 451, 379/438; 248/68.1, 58, 49; 174/60, 64

[56] References Cited

U.S. PATENT DOCUMENTS

| | | | |
|---|---|---|---|
| 3,033,913 | 5/1962 | Dietze | 174/60 |
| 5,067,678 | 11/1991 | Henneberger et al. . | |
| 5,316,243 | 5/1994 | Henneberger . | |

OTHER PUBLICATIONS

ADC Telecommunications brochure entitled "FiberGuide® Fiber Management Systems," 33 pages, dated Oct., 1995.
Warren & Brown & Staff brochure pages entitled, "light-paths," Issue 2, 11 pages, dated 1995.
Warren & Brown & Staff Pty Ltd brochure pages entitled "Optical Fibre Ductwork," 2 pages, undated.
ADC Telecommunications brochure entitled "Fiber Guide™ Fiber Management System," 6 pages, dated Jun. 1989.

Primary Examiner—Jack Chiang
Attorney, Agent, or Firm—Merchant, Gould, Smith, Edell, Welter & Schmidt

[57] ABSTRACT

A cable trough is provided including a bottom portion and two upstanding sides extending from the bottom portion to define a cable pathway. The upstanding sides define an enlarged central portion of the cable trough, and the bottom portion including at least one exit trough portion. The exit trough portion can be centrally located, with a bypass pathway on either side. At least one separator wall is provided to separate the exit trough portion from each bypass pathway. A component flange is also provided extending from one of the upstanding sides. The cable trough can also include a cable storage pathway. Alternatively, two exit trough portions can be positioned on opposite sides of the cable trough adjacent each upstanding side, and on opposite sides of a central bypass pathway.

4 Claims, 9 Drawing Sheets

OPTIC CABLE EXIT TROUGH WITH BYPASS

FIELD OF THE INVENTION

The invention pertains to a system for the management and routing of optical fiber cables.

BACKGROUND OF THE INVENTION

In the telecommunications industry, the use of optical fibers for signal transmissions is accelerating. With the increased utilization of optical fiber systems, optical fiber cable management requires industry attention.

One area where optical fiber management is necessary is the routing of optical fibers from one piece of optical fiber equipment to another. For example, in a telecommunications facility, optical fiber cables may be routed between fiber distribution equipment and optical line terminating equipment. In buildings and other structures which carry such equipment, the cable routing can take place in concealed ceiling areas or in any other manner to route cables from one location to another.

When routing optical fibers, it is desirable to have at least one cable extend generally horizontally through a lateral trough section of a cable routing system, and to also have the capability to exit one or more cables from the lateral trough section. Also, there is a need to provide storage in connection with lateral trough sections. A further need is for storage of cable components, such as connectors within the cable routing system. Also, and perhaps most important, any routing system must protect optical fibers from damage. In the use of optical fibers, it is recognized that the fibers should not be bent beyond a minimum radius of curvature. For example, it is commonly recognized that optical fibers should not be bent in a radius of less than 1.5 inches.

In some cable routing systems, copper cables may extend coextensively with the optical fiber cables. There is a need to manage these two different cables in the cable routing system.

SUMMARY OF THE INVENTION

According to preferred embodiments of the present invention, a cable trough is disclosed for routing optical fiber or other cables between transmission equipment. The trough includes two upstanding sides and a bottom. In one embodiment, the cable trough includes an enlarged central portion defining a downwardly extending central exit trough portion, and two cable bypass portions on opposite sides of the central trough portion. Separator walls extend upwardly within the cable trough to separate the bypass portions from the central exit trough portion. At least one cable storage wall may be positioned in the cable trough between the central exit trough portion and one of the upstanding sides to define a cable storage pathway. A component support flange may be provided and extends inwardly from one of the sides of the cable trough. The flange supports a component for connecting to one of the optical fiber cables. An alternative embodiment of a cable trough includes an enlarged central portion defining a central bypass portion, and two downwardly extending exit trough portions disposed on opposite sides of the central bypass portion. Separator walls extend upwardly within the cable trough to separate the central bypass trough portion from the exit trough portions.

DETAILED DESCRIPTION OF THE PREFERRED EMBODIMENTS

Referring now to FIGS. 1–9, three embodiments of a cable trough 100, 200, 300 are shown. Cable troughs 100, 200, 300 are lateral trough sections utilized in an optical fiber cable routing system which carries optical fibers from one location to another within a structure, such as a building having optical fiber signal transmitting equipment. It is intended that the cable troughs 100, 200, 300 would be suspended from a ceiling structure by any suitable means (not shown). Cable troughs 100, 200, 300 are usable in cable routing systems of the type disclosed in U.S. Pat. Nos. 5,067,678 and 5,316,243, the disclosures of which are hereby incorporated by reference. Cable troughs 100, 200, 300 may also be used to route copper cables from one location to another in addition to routing optical fiber cables.

Cable troughs 100, 200, 300 are related in that each provides a cable exit portion which allows downward exiting of a cable from the trough, as well as a cable bypass portion which allows other cables to bypass the downward exit portion.

Figure 1:
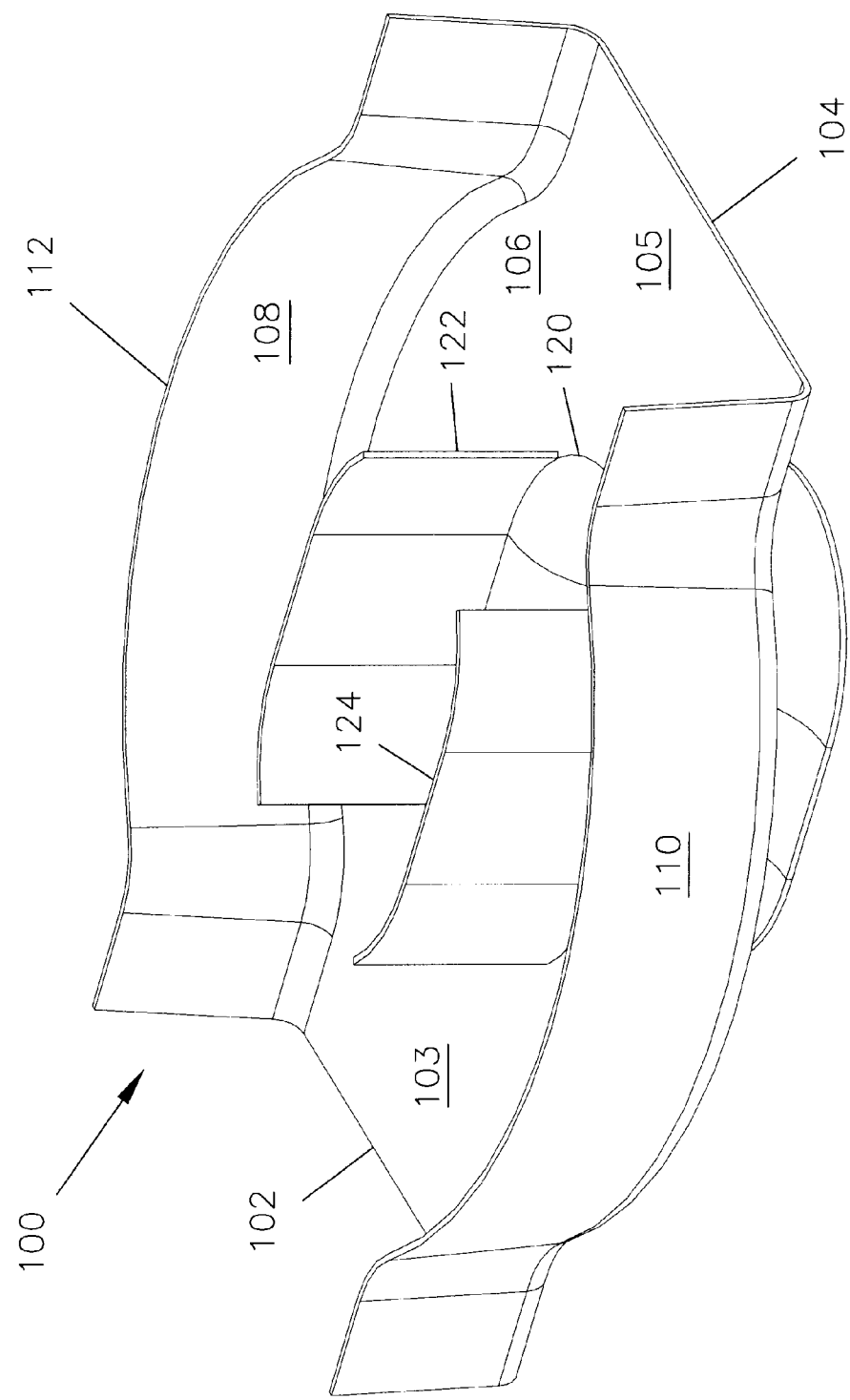
FIG. 1 is a top, side, and end perspective view of a first embodiment of a cable trough.
Figure 2:
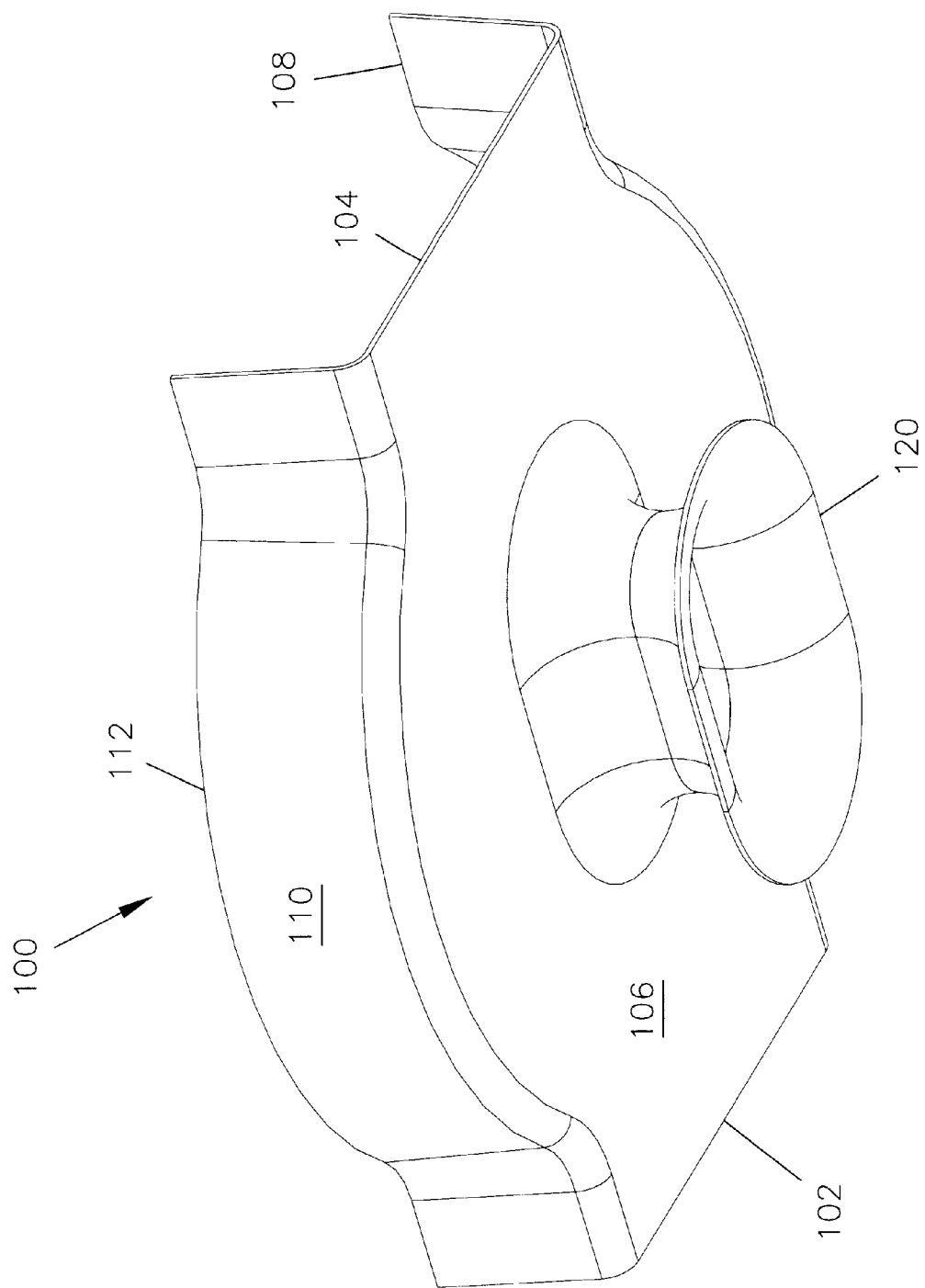
FIG. 2 is a bottom, side, and end view of the cable trough shown in FIG. 1.
Figure 3:
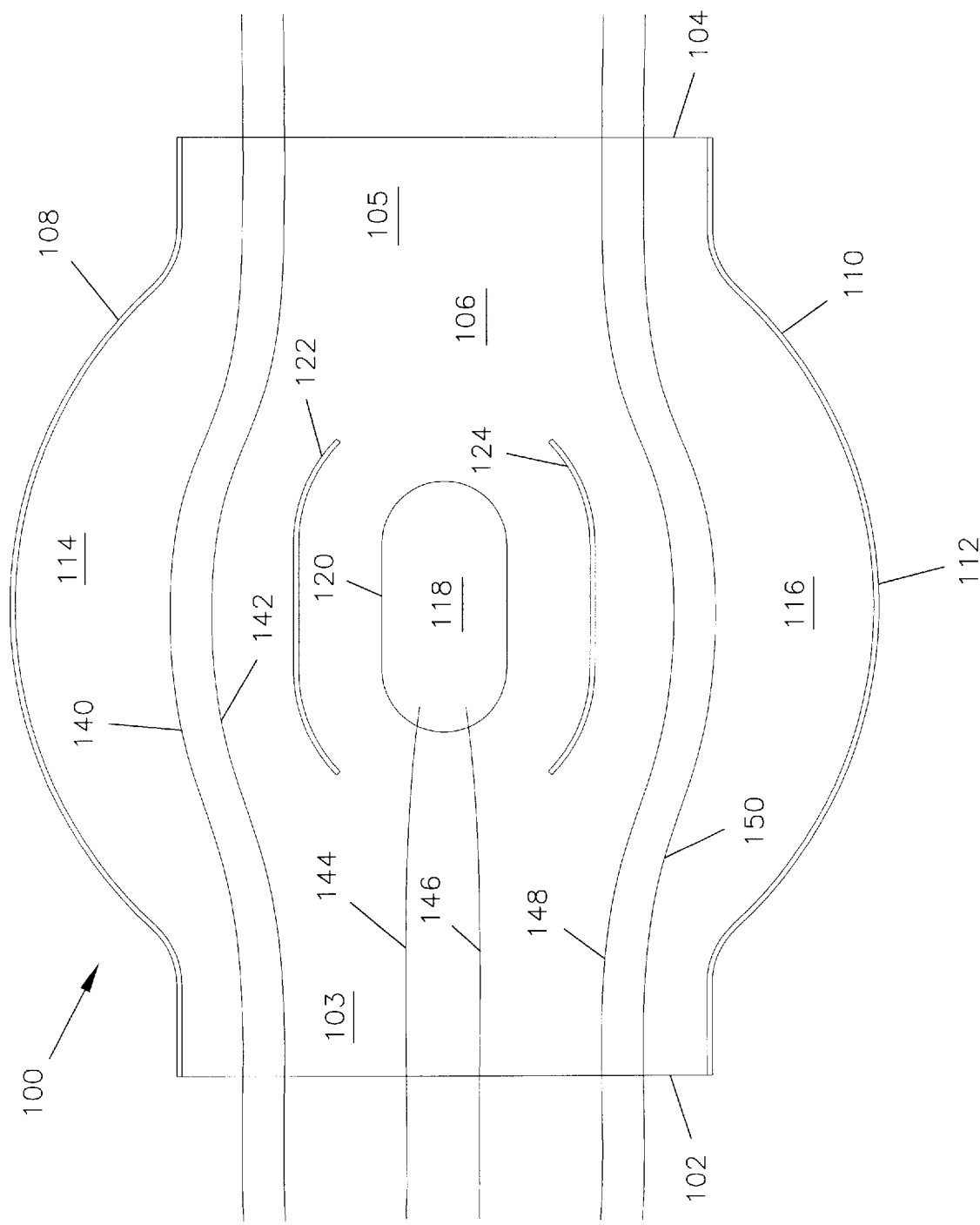
FIG. 3 is a top view of the cable trough shown in FIG. 1, and showing exemplary cables.

Referring now to FIGS. 1–3, trough 100 includes a first end 102 and an opposite end 104. Trough 100 includes a bottom 106 and two upstanding sides 108, 110. Trough 100 generally includes an enlarged central portion 112 defining first and second cable bypass portions 114, 116. Bottom 106 further defines an exit opening 118 through a center of trough 100. Exit opening 118 of trough 100 is formed by an exit trough portion 120 defining curved surfaces for cable protection. Positioned between each respective side 108, 110 and exit trough portion 120 are upwardly extending separator walls 122, 124. As shown in FIG. 3, separator walls 122, 124 are generally C-shaped. Separator wall 122 and side 108, along with bottom 106 defines a first cable bypass pathway 114. Separator wall 124 and side 110 defines a second cable bypass pathway 116.

Ends 102 and 104 are connectable to other cable routing components, such as horizontal trough section, as desired through any suitable means, such as those structures disclosed in U.S. Pat. Nos. 5,067,678 and 5,316,243, or the structures disclosed in pending application 08/818,492, the disclosure of which is incorporated by reference. The inside and/or outside surfaces of trough 100 can be configured as appropriate to mate with the other cable routing components.

Referring now to FIG. 3, various cables 140, 142, 144, 146, 148, 150 are shown routing through trough 100. Cables 140 and 142 pass through trough 100 from first end 102 to second end 104. More specifically, cables 140 and 142 pass from a cable pathway 103 at end 102 through bypass pathway 114 to a cable pathway 105 at end 104. Cables 144 and 146 pass from cable pathway 103 to exit trough portion 120 to exit downwardly from trough 100. Cables 148 and 150 pass from cable pathway 103 through bypass pathway 116 to cable pathway 105. Separator walls 122 and 124 help maintain the cables within one of the bypass pathways 114 and 116. The enlarged central portion 112 helps avoid overly compacting the cables which bypass through trough 100 and do not exit through exit trough portion 120. As shown in FIGS. 1–3, sides 108, 110 and separator walls 122, 124 are provided with curved wall portions to help avoid cable damage by not going below the minimum bending radius of the cable.

Figure 4:
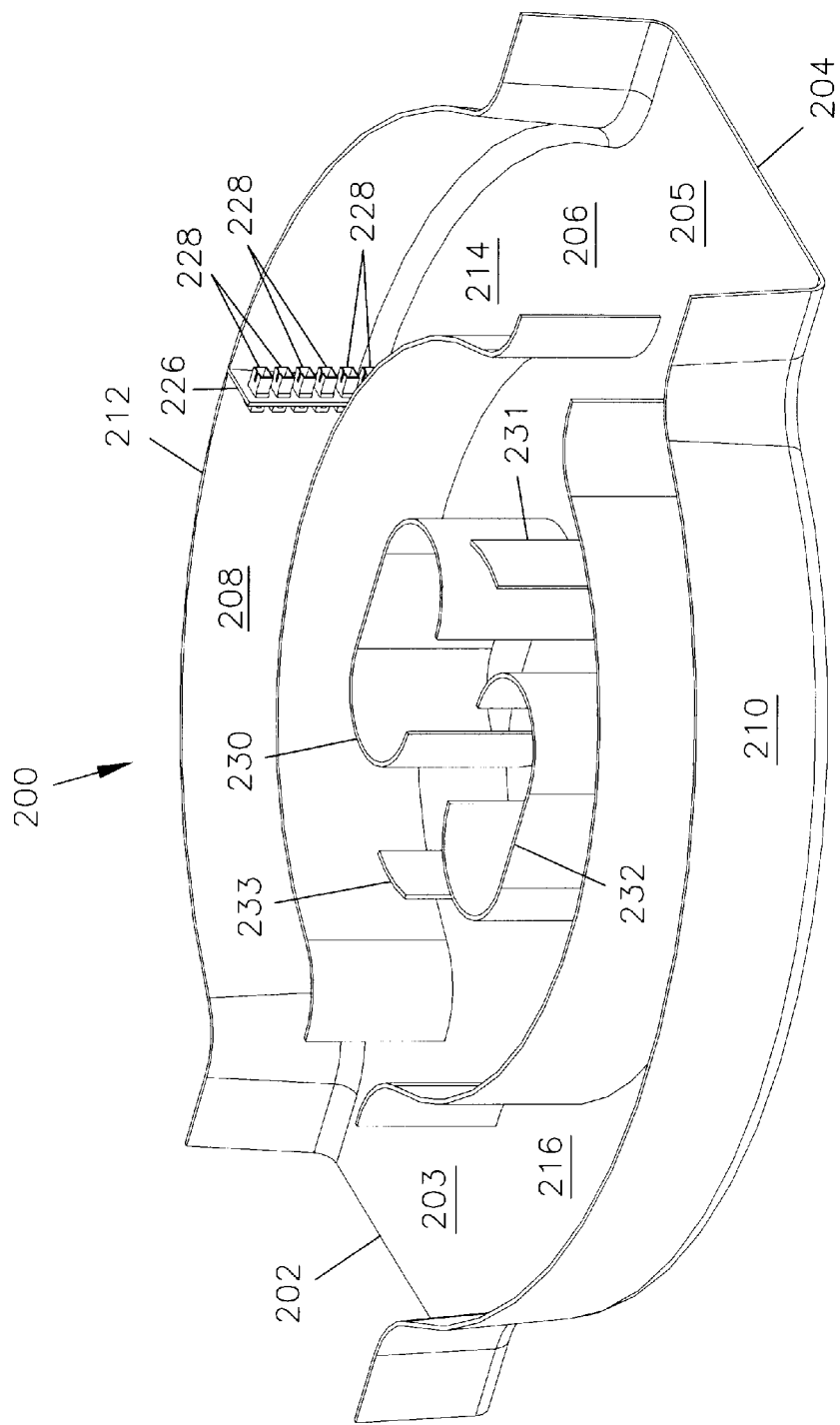
FIG. 4 is a top, side, and end perspective view of a second embodiment of a cable trough.
Figure 5:
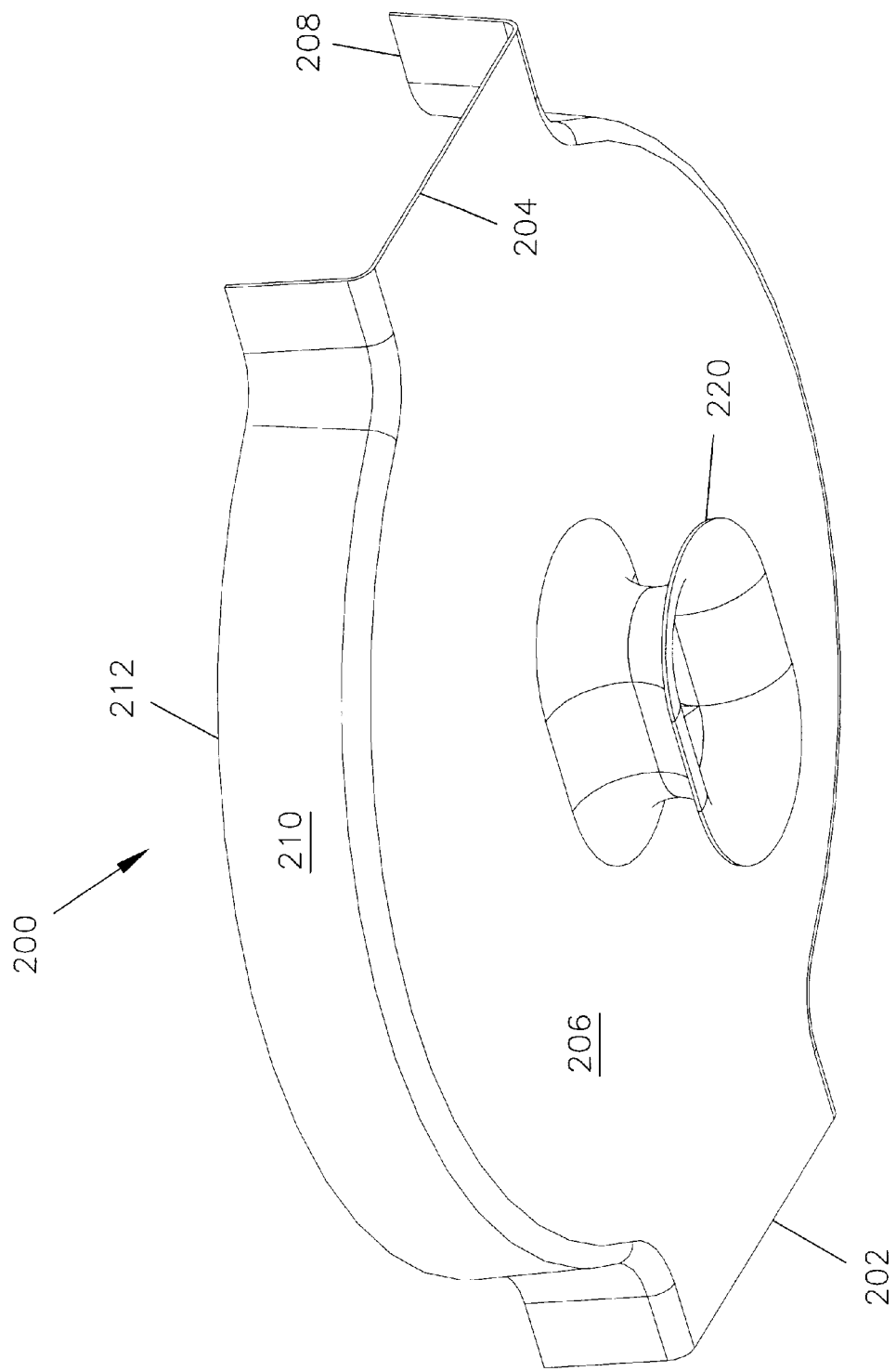
FIG. 5 is a bottom, side, and end view of the cable trough shown in FIG. 4.
Figure 6:
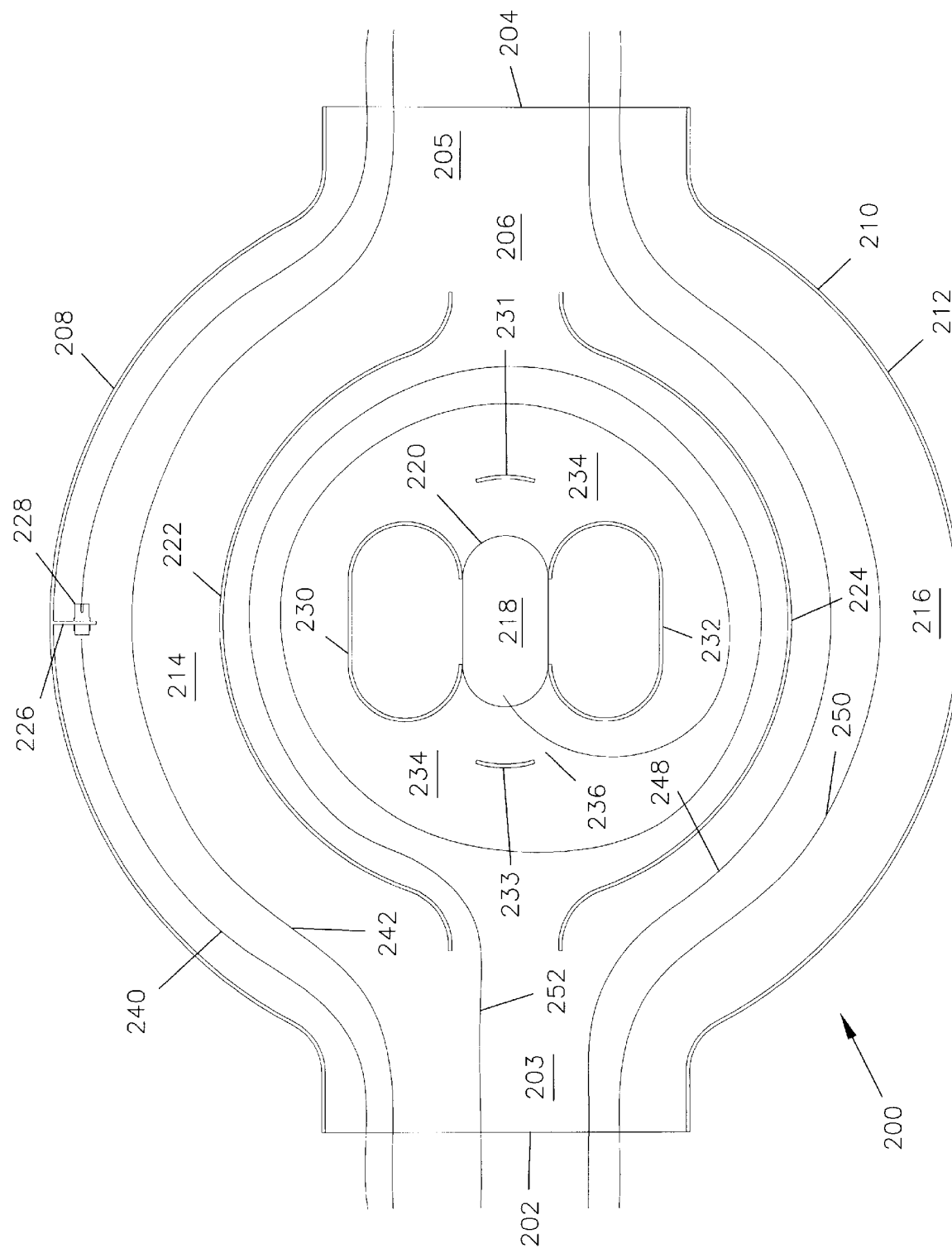
FIG. 6 is a top view of the cable trough shown in FIG. 4, and showing exemplary cables.

Referring now to FIGS. 4–6, trough 200 includes a first end 202 and an opposite end 204. Trough 200 includes a bottom 206 and two upstanding sides 208, 210. Trough 200 generally includes an enlarged central portion 212 defining first and second cable bypass portions 214, 216. Bottom 206 further defines an exit opening 218 through a center of trough 200. Exit opening 218 of trough 200 is formed by an exit trough portion 220 defining curved surfaces for cable protection. Positioned between each respective side 208, 210 and exit trough portion 220 are upwardly extending separator walls 222, 224. As shown in FIG. 6, separator walls 222, 224 are generally C-shaped with outwardly tapered ends. Separator wall 222 and side 208, along with bottom 206 defines a first cable bypass pathway 214. Separator wall 224 and side 210 defines a second cable bypass pathway 216.

Referring now to FIG. 6, various cables 240, 242, 248, 250 are shown routing through trough 200. Cables 240 and 242 pass through trough 200 from first end 202 to second end 204. More specifically, cables 240 and 242 pass from a cable pathway 203 at end 202 through bypass pathway 214 to a cable pathway 205 at end 204. Cables 248 and 250 pass from cable pathway 203 through bypass pathway 216 to cable pathway 205. Separator walls 222 and 224 help maintain the cables within one of the bypass pathways 214 and 216. The enlarged central portion 212 helps avoid overly compacting the cables which bypass through trough 200 and do not exit through exit trough portion 220. As shown in FIGS. 4–6, sides 208, 210 and separator walls 222, 224 are provided with curved wall portions to help avoid cable damage by not going below the minimum bending radius of the cable.

Referring now to FIGS. 4 and 6, trough 200 further includes a component support flange 226 extending inwardly from side 208. Flange 226 supports various components 228 which are utilized with the cables. See for example cable 240 mounted to one of the components 228 mounted to flange 226. Examples of components 228 which may be utilized include connectors, adapters, splitters/combiners, attenuators, splicings, switches, wave division multiplexers, amplifiers, and the like.

Exit trough 200 further includes a cable storage feature including upwardly extending storage walls 230, 231, 232, and 233. Storage walls 230–233 define a cable storage pathway 234 around exit trough portion 220 and inside of separator walls 222, 224. In the case of cable 252 passing through trough 200 from cable pathway 203 and into an area between separator walls 222, 224. Cable 252 is wound around storage walls 230–233 ants number of times as desired, then passes through gap 236, and then exits trough 200 at exit trough portion 220. Storage walls 230, 232 are generally oval-shaped, and storage walls 231, 233 are smaller wall segments each with a slight outward curvature toward storage pathway 234. Other storage walls 230–233 are possible including more or less than the number shown, and in different positions. Generally it is desirable to provide sufficient structure to position all of the cables desiring storage within the storage pathway 234, without going below the minimum bending radius of the cable. Instead of exiting trough 200 at exit trough portion 220, cable 252 can pass through to pathway 205.

Figure 7:
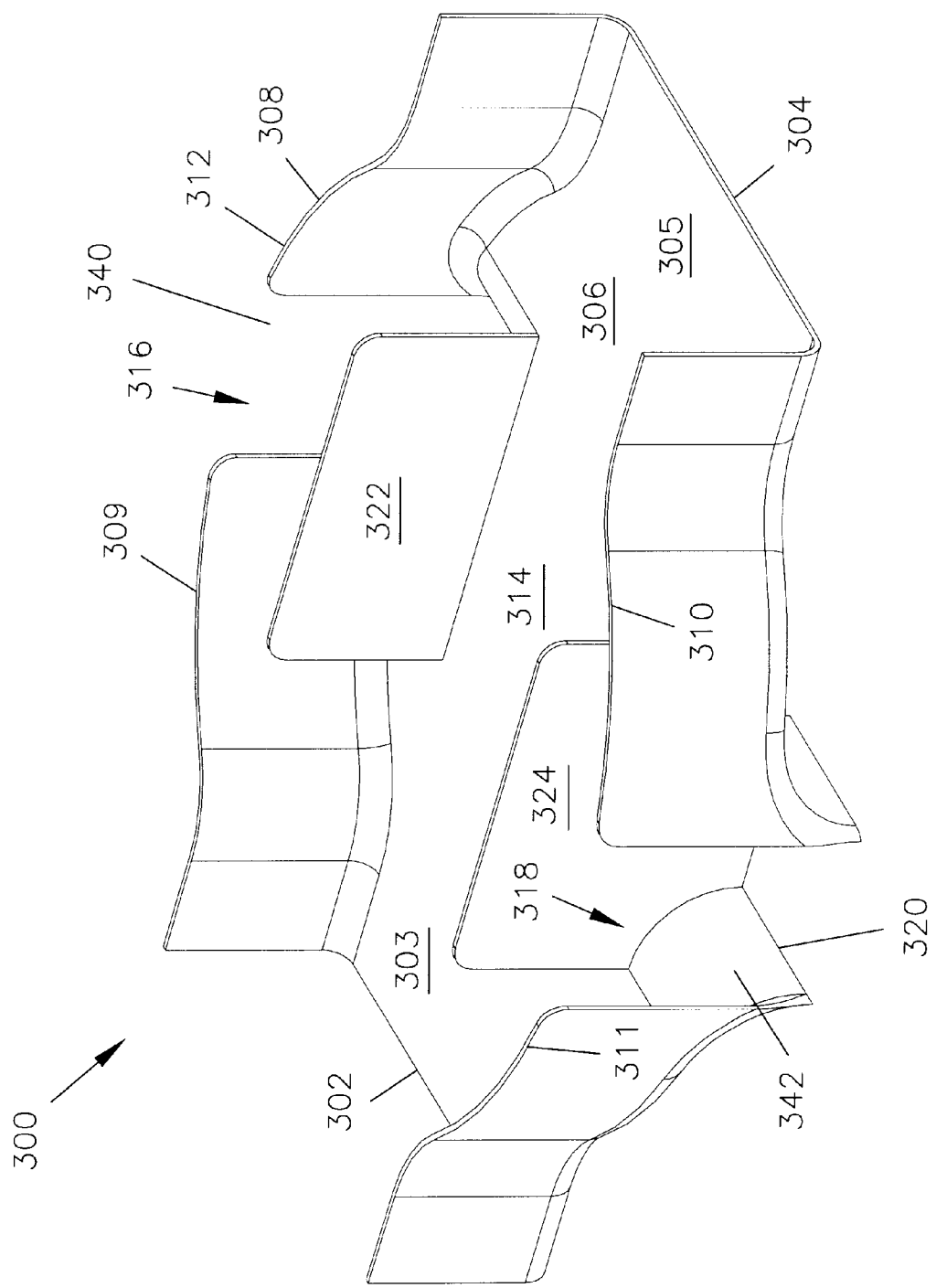
FIG. 7 is a top, side, and end perspective view of a third embodiment of a cable trough.
Figure 8:
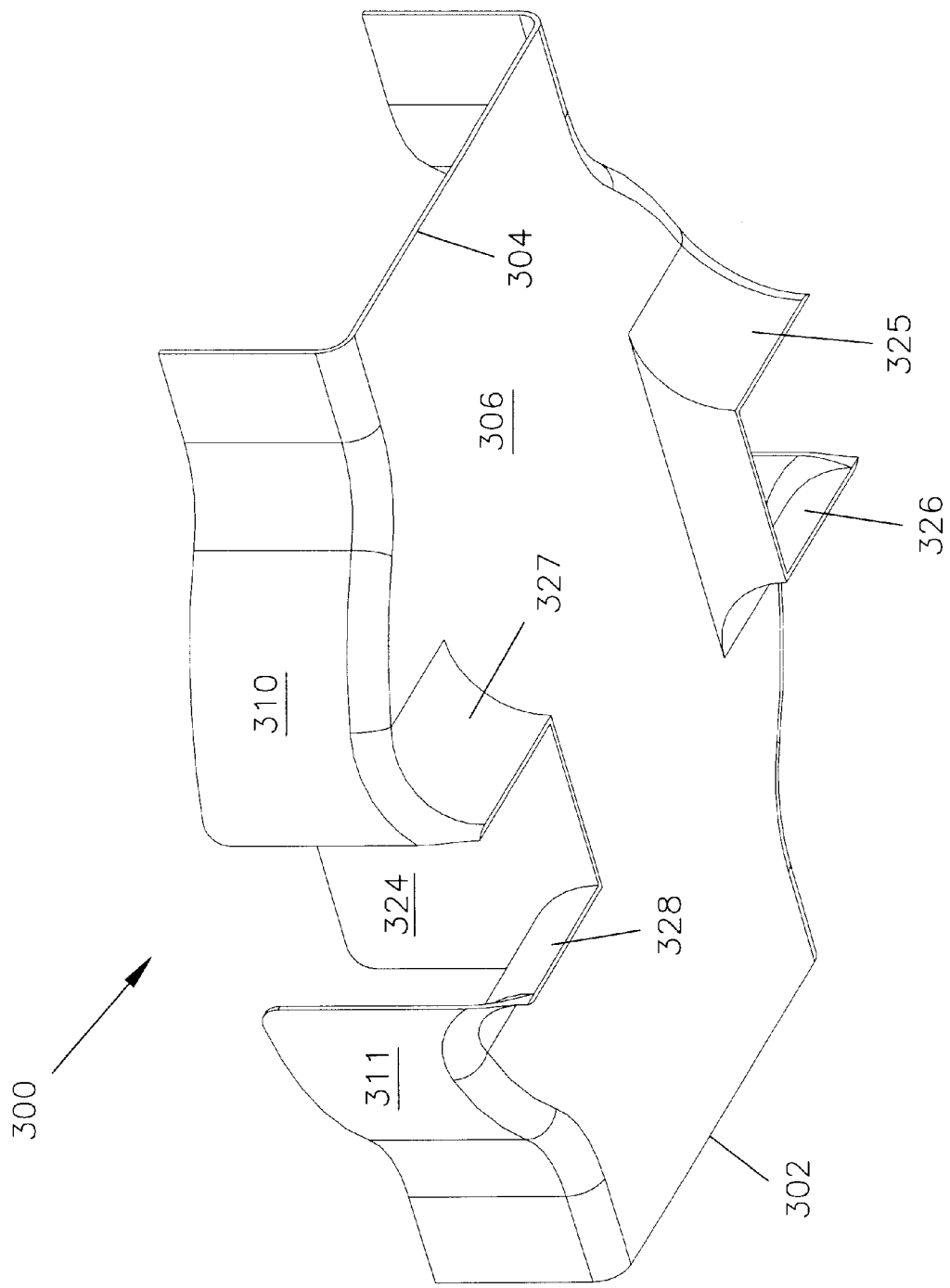
FIG. 8 is a bottom, side, and end view of the cable trough shown in FIG. 7.
Figure 9:
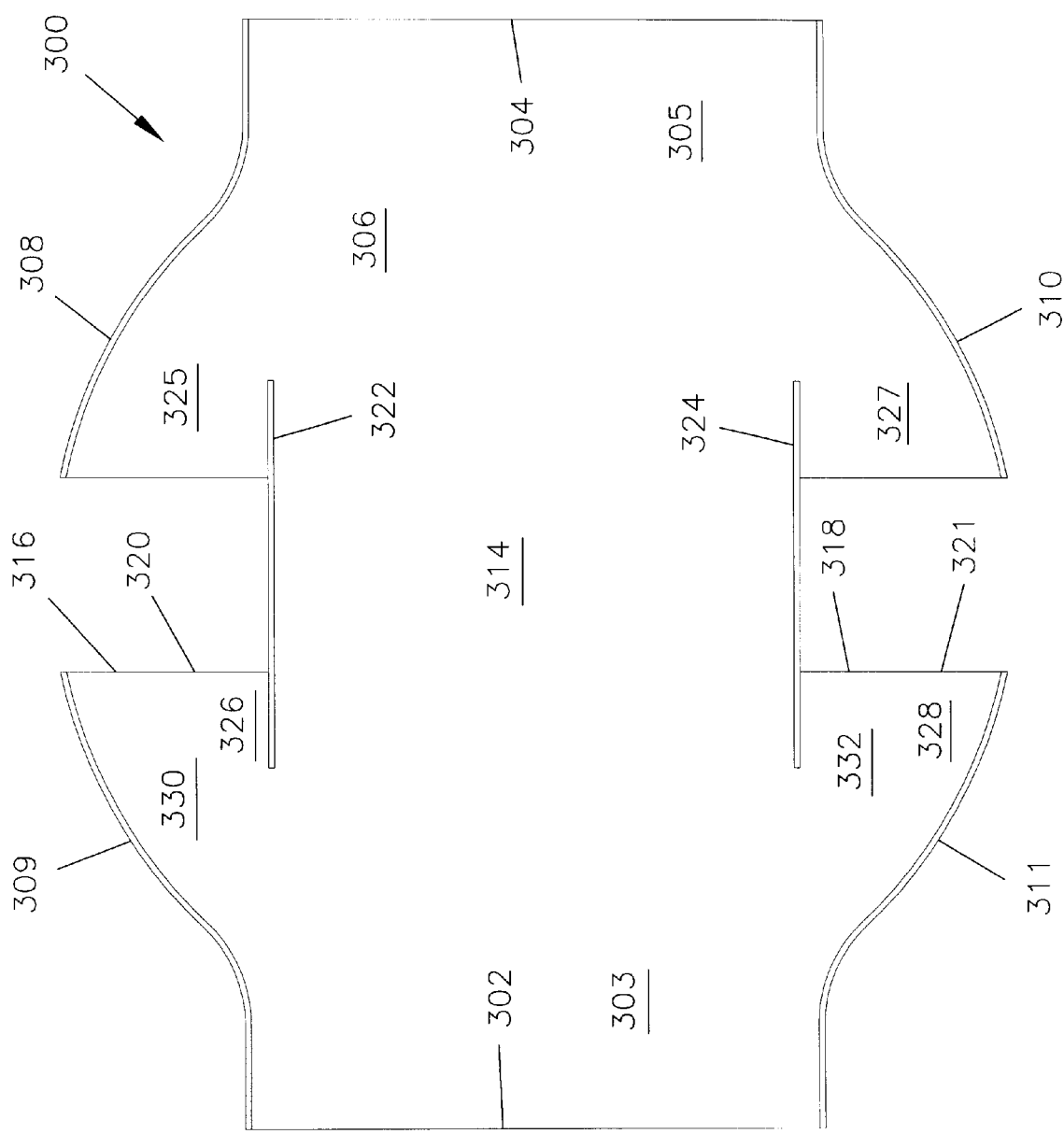
FIG. 9 is a top view of the cable trough shown in FIG. 7.

Referring now to FIGS. 7–9, trough 300 includes a first end 302, and an opposite end 304. A bottom 306 includes upwardly extending sides 308, 309, 310, 311 to define an enlarged central portion 312. A central bypass pathway 314 links end pathways 303 and 305. Side openings 320, 321 form two cable exit trough portions 316, 318 on opposite sides of central bypass pathway 314. Upwardly extending separator walls 322, 324 separate each exit trough portion 316, 318 from central bypass portion 314. Separator walls 322, 324 are generally planar as shown in FIG. 9. Separator walls 322, 324 each create an exit pathways 330, 332, respectively for cable from pathways 303, 305. Exit trough portion 316 includes two downwardly curved bottom surface portions 325, 326. Exit trough portion 318 includes two downwardly curved trough portions 327, 328. Ends 302, 304 are connectable to other cable routing components, as desired. Curved sides 308–311 and the curved surfaces of each exit trough portion 316, 318 protect the cables from going below the minimum bending radius. Trough 300 also includes cable access gaps 340, 342 in the upstanding sidewalls adjacent to exit trough portions 316, 318.

Cables can pass through trough 300 from end 302 to end 304 through central bypass pathway 314, or one or more cables can exit downwardly through one of exit trough portions 316, 318. The enlarged central portion 312 helps avoid overly compacting the cables which bypass through trough 300, and do not exit through exit trough portions 316, 318.

While troughs 100, 200, 300 are usable with optical fiber cables, copper cables may also be routed through troughs 100, 200, 300 simultaneously with the optical fiber cables. In that case the dual bypass pathways of troughs 100, 200, and the dual exit trough portions 316, 318 of trough 300 can be used to segregate the cables, as desired.

Having described the present invention in a preferred embodiment, modifications and equivalents may occur to one skilled in the art. It is intended that such modifications and equivalents shall be included within the scope of the claims which are appended hereto.

What is claimed is:

1. A cable trough comprising:
   a bottom portion;
   two upstanding sides extending from the bottom portion to define a cable pathway;
   the cable trough having first and second opposed ends and a central portion disposed therebetween, the upstanding sides spaced further apart from each other in the central portion than on each end to define an enlarged central portion of the cable trough;
   the enlarged central portion of the cable trough including a downwardly extending, central exit trough portion through the bottom portion;
   two upstanding separator walls extending upwardly from the bottom portion, each separator wall positioned on opposite sides of the central exit trough portion, each separator wall laterally spaced from the respective sides to each define a cable bypass pathway between the first and second ends.

2. The cable trough of claim 1, further comprising at least one upwardly extending cable storage wall adjacent to the exit trough portion defining a cable storage pathway between the cable storage wall and at least one of the separator walls.

3. The cable trough of claim 1, further comprising a component support flange extending inwardly from one of the upstanding sides in a direction toward the other side, and an optical fiber cable component mounted to the component support flange.

4. A cable trough comprising:

a bottom portion;

two upstanding sides extending from the bottom portion to define a cable pathway;

the cable trough having first and second opposed ends and a central portion disposed therebetween, the upstanding sides spaced further apart from each other in the central portion than on each end to define an enlarged central portion of the cable trough;

the enlarged central portion of the cable trough including two downwardly extending side exit trough portions through the bottom portion;

two upstanding separator walls extending upwardly from the bottom portion, one separator wall positioned adjacent to each exit trough portion, each separator wall positioned on opposite sides of the bottom portion, each separator wall laterally spaced from each other to each define a central cable bypass pathway between the first and second ends.

* * * * *